(12) United States Patent
Kim

(10) Patent No.: US 6,236,419 B1
(45) Date of Patent: May 22, 2001

(54) LIQUID ELECTROPHOTOGRAPHIC IMAGING SYSTEM

(75) Inventor: Yong-kook Kim, Seongnam (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 0 days.

(21) Appl. No.: 09/484,278

(22) Filed: Jan. 18, 2000

(30) Foreign Application Priority Data

Jan. 25, 1999 (KR) .................................................. 99-2170

(51) Int. Cl.[7] .................................................. G03G 21/00
(52) U.S. Cl. ............................. 347/138; 355/30; 399/98
(58) Field of Search ..................................... 347/129, 133, 347/134, 138; 399/98, 99, 91; 355/30

(56) References Cited

U.S. PATENT DOCUMENTS 5,613,174 * 3/1997 Denton et al. ......................... 399/98
5,904,870 * 5/1999 Fenner et al. ......................... 219/201

* cited by examiner

*Primary Examiner*—Joan Pendergrass
(74) *Attorney, Agent, or Firm*—Sughrue, Mion, Zinn, Macpeak & Seas, PLLC

(57) ABSTRACT

In a liquid electrophotographic imaging system including a photoreceptor medium, a laser scanning unit scans light onto the photoreceptor medium to form an electrostatic latent image on a photoreceptor surface of the photoreceptor medium. A development unit develops an image on the photoreceptor surface corresponding to an electrostatic latent image formed by the laser scanning unit with toner carried by a liquid carrier. A cabinet encloses the photoreceptor medium, the laser scanning unit, and the development unit to prevent the carrier in a gaseous state after being used during development from escaping to the outside. In the laser scanning unit including a light emitting unit, a beam deflector deflects and scans the light emitted from the light emitting unit. A housing encloses the light emitting unit and the beam deflector and has a transparent window through which the light scanned by the beam deflector passes. A temperature controlling unit is installed outside the housing and maintains a predetermined temperature around the transparent window, so that the carrier and/or vapor is prevented from beading on the transparent window and dispersion of light emitted to the photoreceptor medium is prevented.

3 Claims, 6 Drawing Sheets

LIQUID ELECTROPHOTOGRAPHIC IMAGING SYSTEM

BACKGROUND OF THE INVENTION

1. Field of the Invention

The present invention relates to a liquid electrophotographic imaging system and, more particularly, to a liquid electrophotographic imaging system having an improved structure which prevents a carrier used during development from condensing at an output window of an optical scanning unit.

2. Description of the Related Art

In general, a liquid electrophotographic imaging system is an apparatus for forming an image on a photoreceptor medium such as a photoreceptor web or a photoreceptor drum by developer which is a mixture of a solid toner and a liquid carrier, and transferring the image to a sheet of print paper.

Referring to FIG. 1, a general liquid electrophotographic imaging system includes a photoreceptor medium 20 such as a photoreceptor web circulating around a predetermined path by being supported by a steering roller 11, a driving roller 13 and a transfer backup roller 15. The photoreceptor medium 20 is charged by a charger 23 to a predetermined electric potential. The charged electric potential varies in response to the light scanned by a laser scanning unit (LSU) 30. A discharger 21 provided around the photoreceptor web 20 resets the electric potential formed on the photoreceptor medium 20. The charger 23 charges the photoreceptor web 20 to a predetermined electric potential. The laser scanning unit 30 forms an electrostatic latent image corresponding to each color by scanning light onto the photoreceptor medium 20. Development units 25 are provided, one for each corresponding color of yellow (Y), magenta (M), cyan (C) and black (K). An image is formed in an area where an electrostatic latent image corresponding to each color is formed. That is, each development unit 25 carries solid toner of a certain color using the liquid carrier to a development gap between the development unit 25 and the photoreceptor medium 20. An image is formed in an area corresponding to the electrostatic latent image due to a difference between the electric potential applied to the photoreceptor medium 20 and the electric potential for development. Excess carrier left over on the photoreceptor web 20 is removed by a drying unit 27. The image formed on the photoreceptor web 20 is transferred to a print paper P by a transfer unit 29.

The structural elements including the photoreceptor medium 20, the laser scanning unit 30, and the development unit 25 are housed in a cabinet 10 having an inlet and an outlet through which the print paper P enters and exists, respectively. The cabinet 10 is for preventing the carrier which exists in a gaseous state by passing the drying unit 27 and the transfer unit 29 after being used during development from escaping to the outside .

Referring to FIGS. 2 and 3, the laser scanning unit 30 is comprised of a driving source 51, a deflection disk 55 having a plurality of sectors, each having a hologram pattern, a light emitting means 40 disposed at one side of the deflection disk 55 for emitting light to the deflection disk 55, an optical path changing means for changing a proceeding direction of the light deflected by the deflection disk 55, and a housing 31 housing the above structural elements and having transparent windows 35 through which scanning light passes. To correspond to a color image, the light emitting means 40 is comprised of first through fourth light sources 41, 43, 45 and 47 suitable for yellow, magenta, cyan, and black, respectively. The light emitted from each of the first through fourth light sources 41, 43, 45 and 47 is incident on a predetermined position of the deflection disk 55. Here, the light path changing means includes a plurality of flat mirrors $M_{11}$, $M_{12}$, $M_{21}$, $M_{22}$, $M_{31}$, $M_{32}$, $M_{41}$, and $M_{42}$, other flat mirrors M, curved mirrors $CM_1$, $CM_2$, $CM_3$, and $CM_4$, and holographic optical elements $HOE_1$, $HOE_2$, $HOE_3$, and $HOE_4$. The curved mirrors $CM_1$–$CM_4$ are for focusing and reflecting scanning lines input through a plurality of optical paths via the flat mirrors M to make and maintain the scanning lines emitted to be parallel to each other. Also, the curved mirrors $CM_1$–$CM_4$ correct diffraction of incident light due to the holographic pattern of the deflection disk 55 and bowing, a phenomenon in which the scanning line is bent, caused by forming the scanning line by rotation of the deflection disk 55. By diffracting and transmitting the scanning line incident on the holographic optical elements $HOE_1$–$HOE_4$ at a predetermined angle, the scanning line is made to proceed in a direction perpendicular to the photoreceptor medium 20.

The housing 31 allows the above optical elements to be installed at predetermined positions inside the cabinet 10 and prevents the optical path changing means from being contaminated by developer in the cabinet 10. The scanning lines proceeding toward the photoreceptor medium 20 via the holographic optical elements $HOE_1$–$HOE_4$ pass through the transparent windows 35.

The carrier in a gaseous state and/or vapor in the cabinet 10 adheres to an inside wall of the cabinet 10, the housing 31 of the laser scanning unit, and the transparent windows 35. Particularly, the carrier N and/or vapor ($H_2O$) condensed on the transparent windows 35 form drops due to the surface energy of the transparent windows 35. Such formation of drops is called beading.

When there is beading in an area where the scanning line 100 (see FIG. 3) passes, the scanning line disperses. Thus, as shown in FIG. 4, an unclear image 111, i.e., color spreading on a desired image 110, is formed on the photoreceptor medium 20.

Therefore, since the carrier and/or vapor is formed on the transparent windows and the scanning lines disperse due to beading, resolution of an image is lowered and print quality is deteriorated.

SUMMARY OF THE INVENTION

It is an objective of the present invention to provide a liquid electrophotographic imaging system in which the carrier used during development is prevented from condensing on an exit window of the laser scanning unit.

To achieve the above objective, the present invention provides a liquid electrophotographic imaging system, which comprises a photoreceptor medium, a for scanning light onto the photoreceptor medium to form an electrostatic latent image on a photoreceptor surface of the photoreceptor medium, a development unit for developing an image on the photoreceptor surface corresponding to an electrostatic latent image formed by the laser scanning unit with toner carried by a liquid carrier, a cabinet enclosing the photoreceptor medium, the laser scanning unit, and the development unit to prevent the carrier in a gaseous state after being used during development from escaping to the outside. The laser scanning unit comprises a light emitting unit, a beam deflector for deflecting and scanning the light emitted from the light emitting unit, a housing enclosing the light emitting unit and the beam deflector and having at least one transparent window through which the light scanned by the beam deflector passes, and a temperature controlling unit installed outside the housing for maintaining a predetermined temperature around the transparent window, so that the carrier and/or vapor is prevented from beading on the transparent window and dispersion of light emitted to the photoreceptor medium is prevented.

BRIEF DESCRIPTION OF THE DRAWINGS

The above objective and advantages of the present invention will become more apparent by describing in detail a preferred embodiment thereof with reference to the attached drawings, in which.

DETAILED DESCRIPTION OF THE INVENTION

Figure 1:
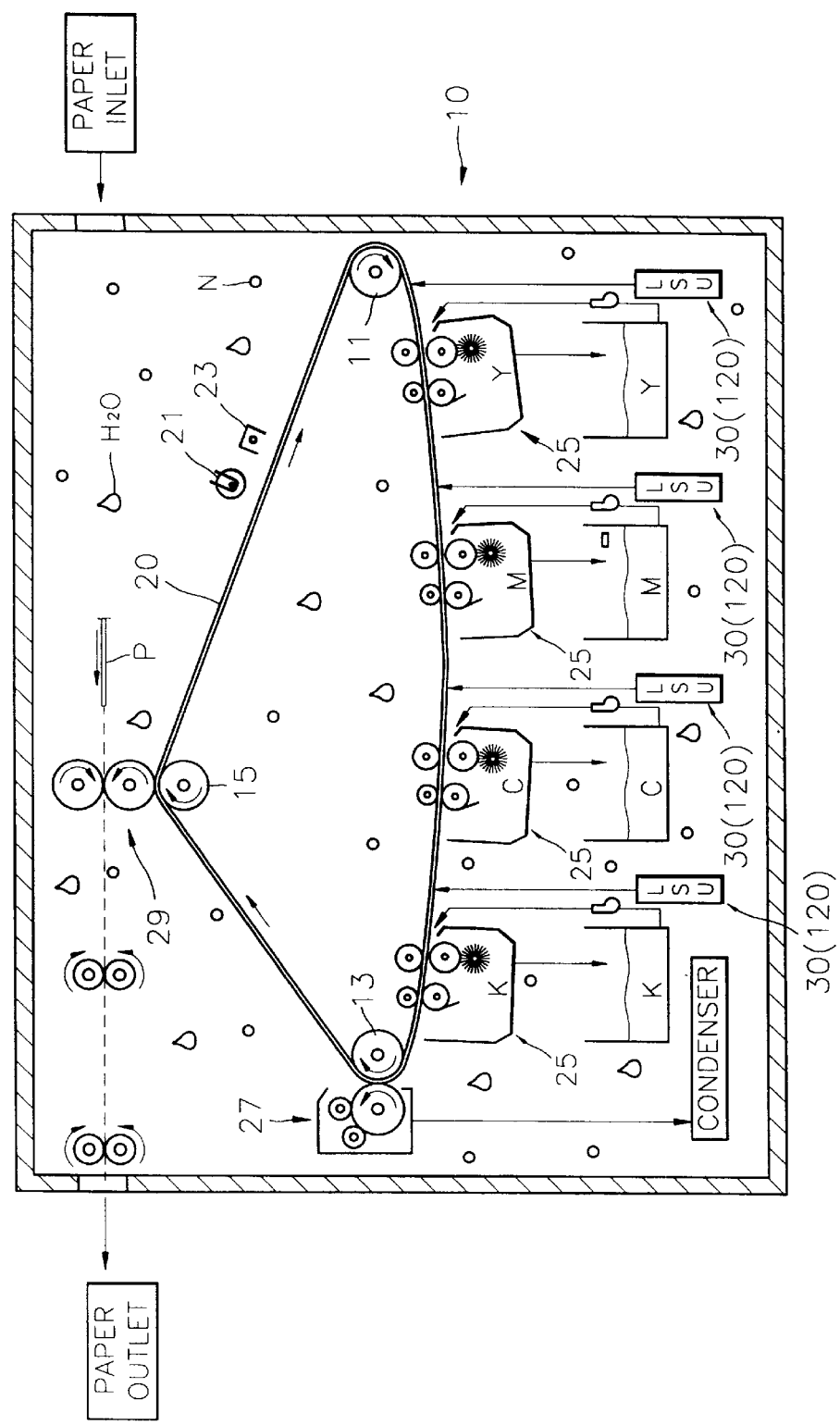
FIG. 1 is a view schematically showing the structure of a general liquid electrophotographic color imaging system.
Figure 2:
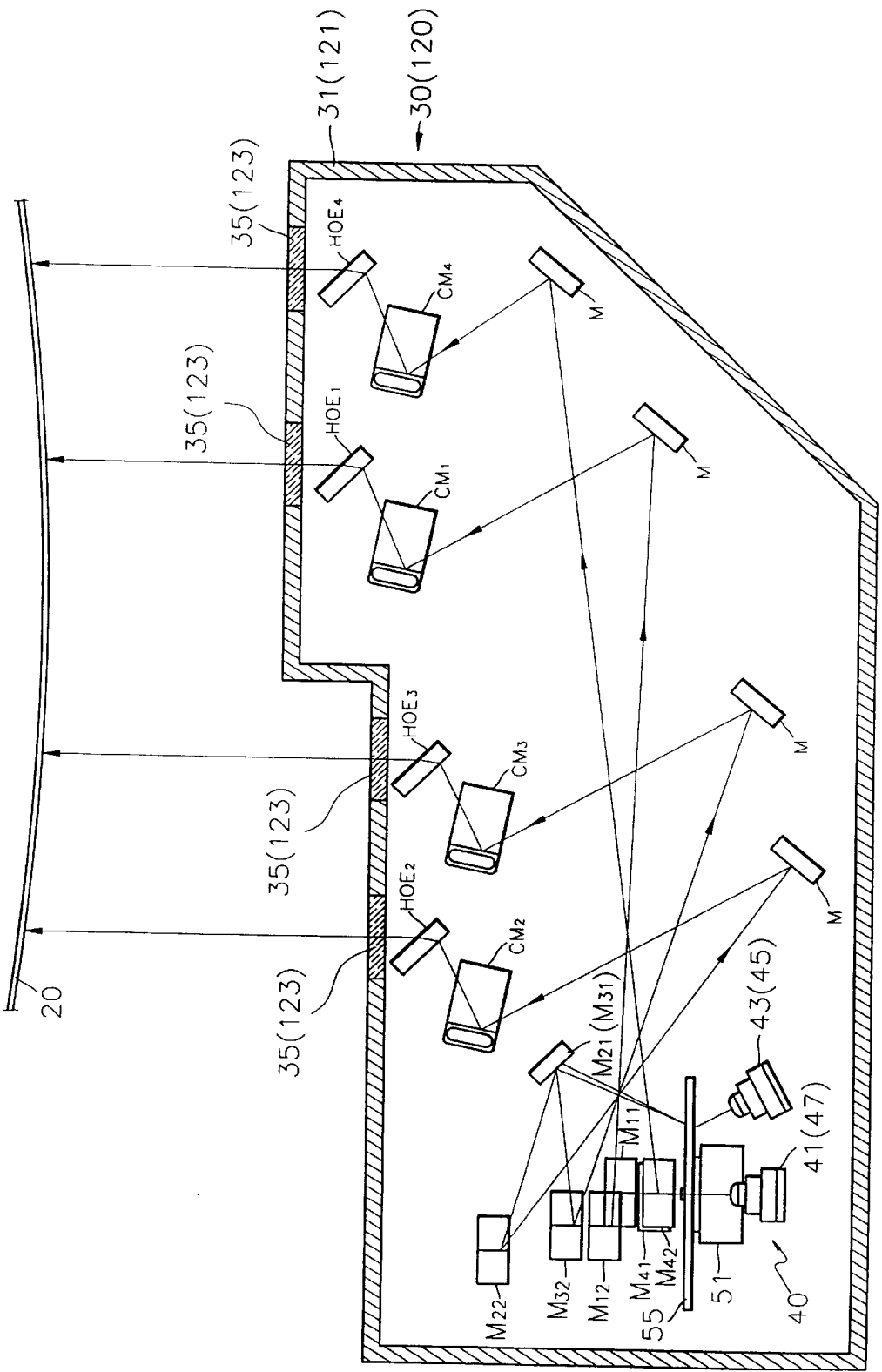
FIG. 2 is a view showing the laser scanning unit of FIG. 1.
Figure 3:
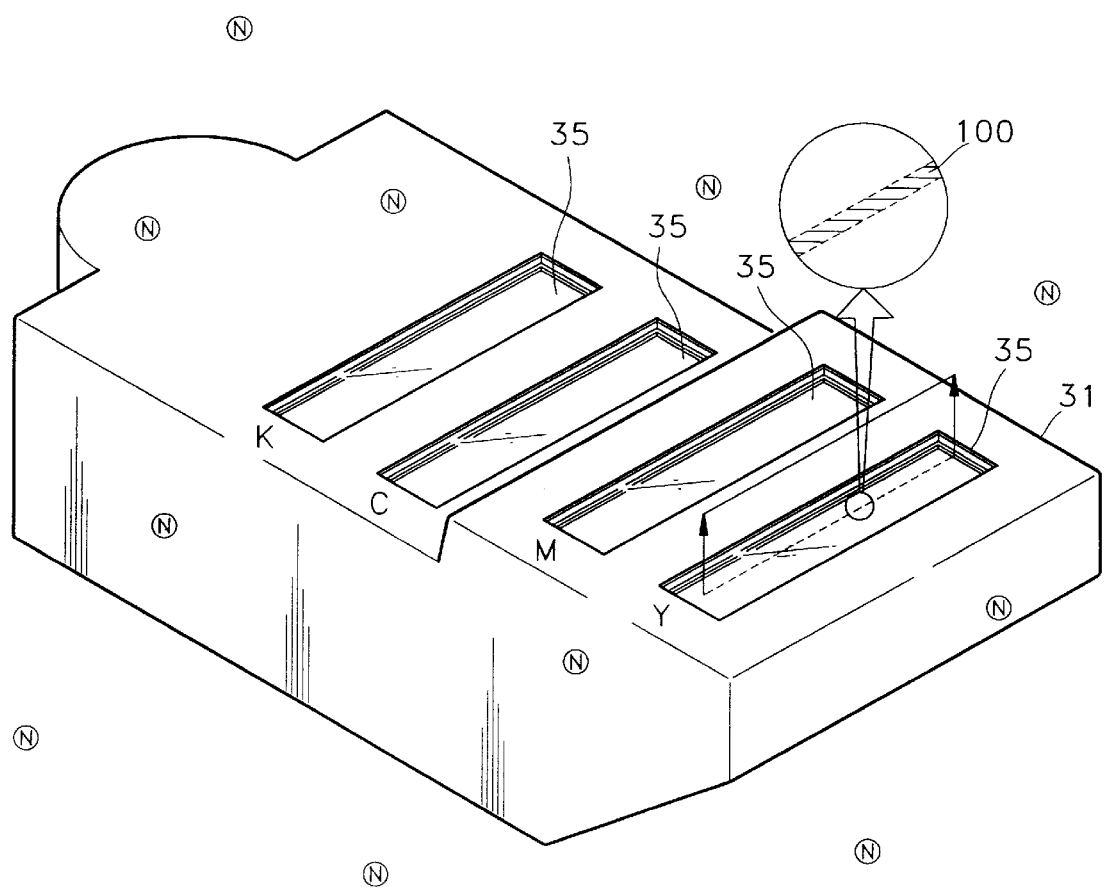
FIG. 3 is a perspective view of the laser scanning unit showing carrier condensed on the transparent window.
Figure 4:
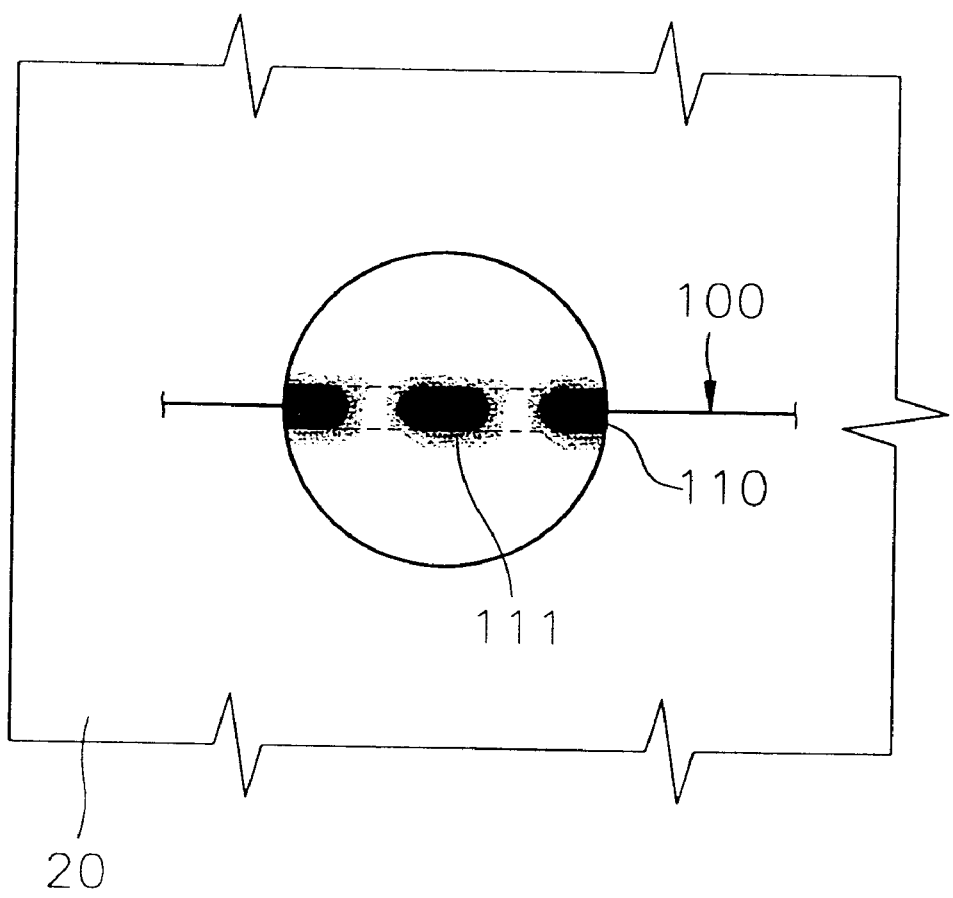
FIG. 4 is a view showing part of the photoreceptor medium to set forth a degree of spreading of an image scanned by the laser scanning unit of FIG. 3 and formed on the photoreceptor medium.
Figure 5:
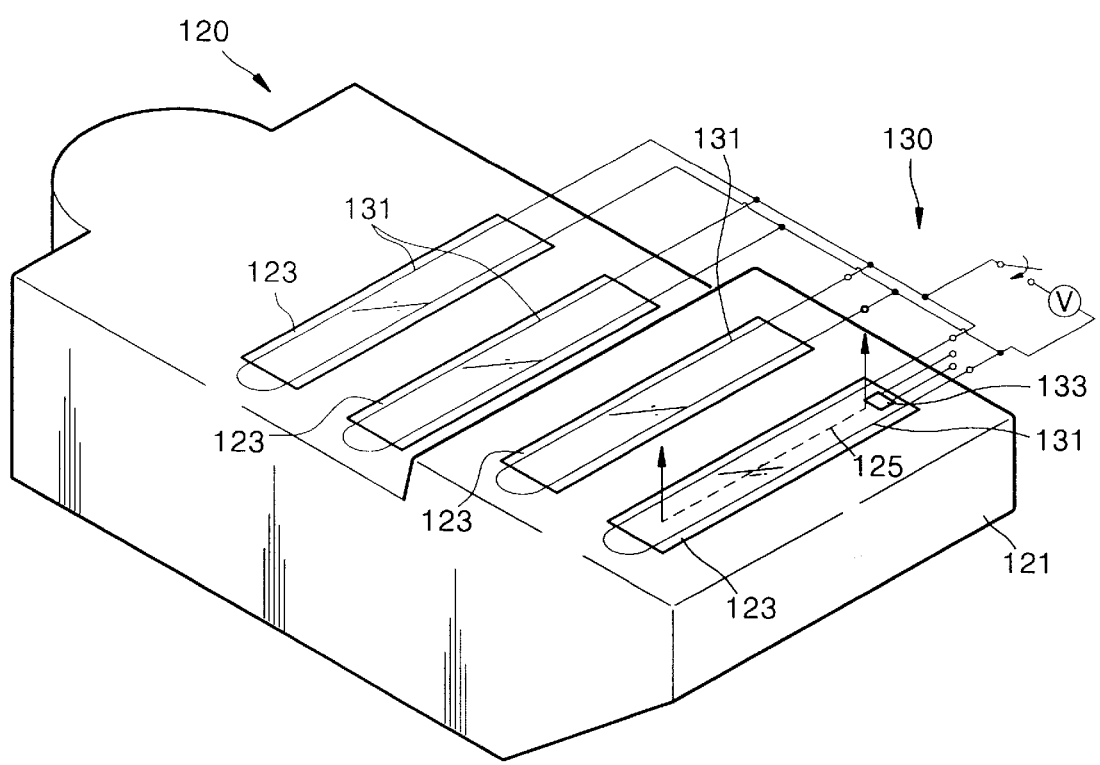
FIG. 5 is a perspective view of a laser scanning unit adopted in a liquid electrophotographic color imaging system according to a preferred embodiment of the present invention.

The liquid electrophotographic imaging system according to a preferred embodiment of the present invention, as shown in FIGS. 1, 2 and 5, includes the photoreceptor medium 20, a laser scanning unit 120 for scanning light to the photoreceptor medium 20 to form an electrostatic latent image on a photoreceptor surface, the development unit 25 developing an image on the photoreceptor surface corresponding to the electrostatic latent image formed by the laser scanning unit 120 with toner carried by a liquid carrier, and the cabinet 10 enclosing the structural elements to prevent the carrier N, which is in a gaseous state after being used during development, from escaping to the outside. The photoreceptor medium 20 supported by the steering roller 11, the driving roller 13, and the transfer backup roller 15 circulates around a predetermined path.

The laser scanning unit 120 scans light onto the photoreceptor medium 20 to form an electrostatic latent image corresponding to each color image. For the above, as shown in FIGS. 2 and 5, the laser scanning unit 120 includes the light emitting means 40, a beam deflector such as a deflection disk for deflecting and scanning the light emitted from the light emitting means 40, a housing 121 enclosing the light emitting means 40 and the beam deflector and having transparent windows 123 through which the light scanned by the beam deflector passes, and a temperature controlling means 130 installed outside the transparent window 123. In this case, the beam deflector includes a driving source 51 and a deflection disk 55 having a plurality of sectors in each of which a holographic pattern is formed. Also, the beam deflector may be configured to include a polygon mirror (not shown) rotated by a driving source.

It should be noted that throughout the description of the imaging system according to the present invention with reference to FIGS. 1 and 2, the same reference numerals denote the same elements having the same function. Thus, a description thereof will be omitted.

An important feature of the present invention is that the temperature controlling means 130 is formed around the transparent windows 123 of the laser scanning unit 120 to maintain a predetermined temperature around the transparent windows 123 so that the carrier N and/or $H_2O$ vapor is prevented from being condensed on the transparent windows 123.

Figure 6:
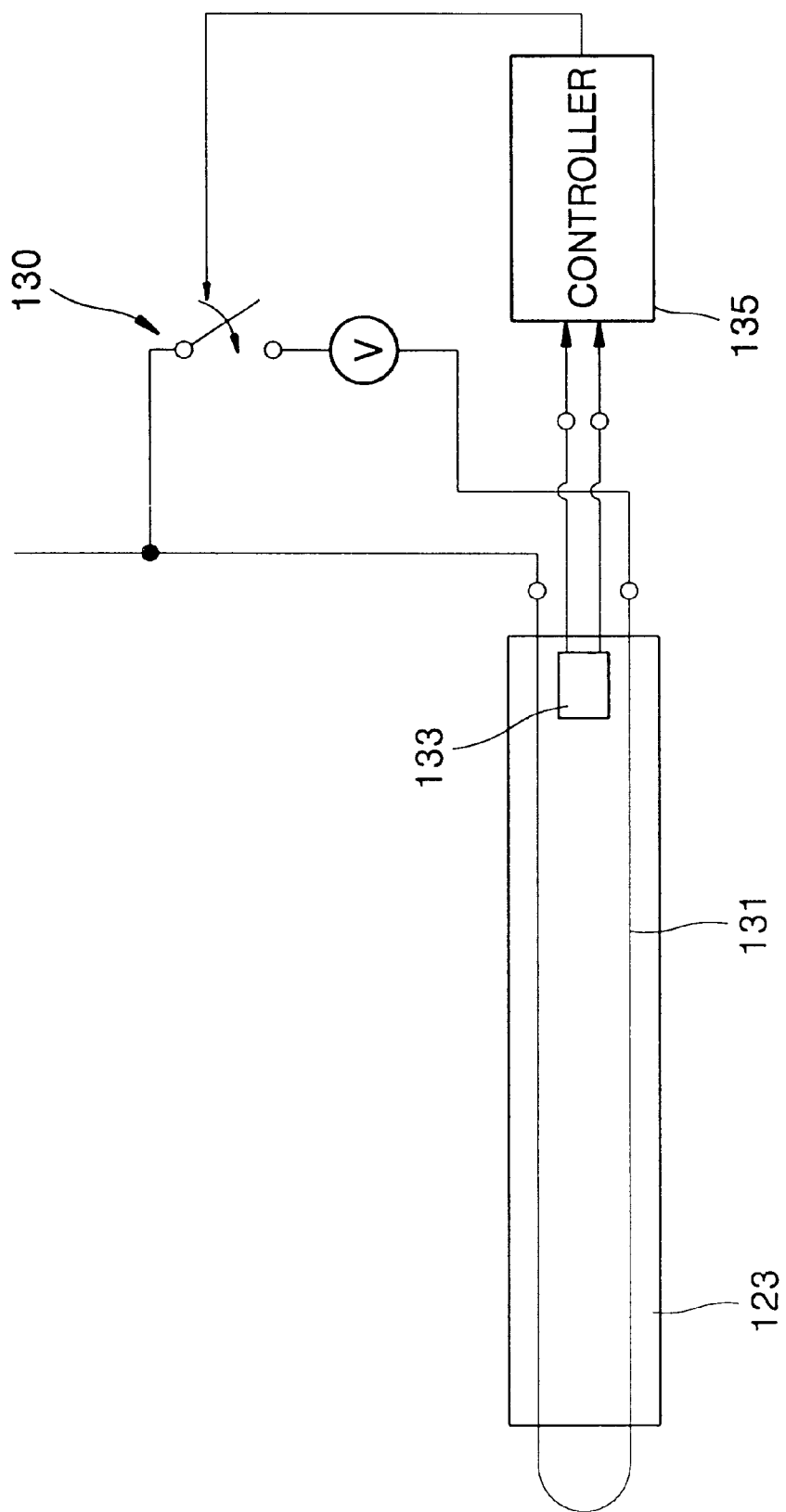
FIG. 6 is a view showing a temperature controlling means of FIG. 5.

Referring to FIGS. 5 and 6, the temperature controlling means 130 includes a hot wire 131 installed to not interfere in an area of the corresponding transparent window 123 where the scanning line 125 passes, a heat sensor 133 for detecting the temperature around the transparent window 123, and a controller 135 for controlling the hot wire 131 according to the temperature detected by the heat sensor 133. The hot wire 131 heats the outer surface of the corresponding transparent window 123 according to on/off switching of power source V. The hot wire 131 is formed of nichrome (Ni-Cr) wire and a detailed description thereof will be omitted since the nichrome wire itself is widely used as a common heater.

A shown in FIG. 5, the laser scanning unit 120 is installed to be suitable for a color imaging system. Thus, in the case in which the color imaging system has four transparent windows 123, it is preferable that the hot wire 131 is installed at each transparent window 123 and that the installed hot wire is concurrently controlled according to on/off switching of the power source V.

The heat sensor 133 is installed at at least one transparent window 123 and detects the temperature around the outside of the transparent window 123. The controller 135 compares the temperature detected by the heat sensor 133 with a set reference temperature. When the temperature around the transparent window 123 is lower than the set reference temperature during development, the controller 135 turns on the power source V. When the temperature of the transparent window 123 is higher than the set reference temperature, the controller 135 turns off the power source V. Thus, the carrier N in a gaseous state and $H_2O$ vapor existing in the cabinet 10 can be prevented from beading on the transparent windows 123.

As described above, according to the liquid electrophotographic imaging system according to the present invention, beading of a carrier and moisture such as vapor on the transparent window of the laser scanning unit is prevented by the temperature controlling means. Thus, the quality of a printed image is improved.

What is claimed:

1. A liquid electrophotographic imaging system comprising:

a photoreceptor medium;

a laser scanning unit which scans light onto said photoreceptor medium to form an electrostatic latent image on a photoreceptor surface of said photoreceptor medium;

a development unit which develops an image on said photoreceptor surface corresponding to an electrostatic latent image formed by said laser scanning unit with toner carried by a liquid carrier;

a cabinet enclosing said photoreceptor medium, said laser scanning unit, and said development unit to prevent said carrier in a gaseous state after being used during development from escaping to the outside, wherein said laser scanning unit comprises:

a light emitting unit;

a beam deflector which deflects and scans the light emitted from said light emitting unit;

a housing enclosing said light emitting unit and said beam deflector and having at least one transparent window through which the light scanned by said beam deflector passes; and a temperature controlling unit installed outside said housing and which maintains a predetermined temperature around said transparent window, so that the carrier and/or vapor is prevented from beading on said transparent window and dispersion of light emitted to said photoreceptor medium is prevented.

2. The system as claimed in claim 1, wherein said temperature controlling unit comprises:

a hot wire installed on said transparent window so as not to interfere with a scanning line and for generating heat;

a heat sensor for detecting a temperature around said transparent window; and a controller which controls said hot wire according to the temperature detected heat sensor.

3. The system as claimed in claim 2, wherein said at least one transparent window further comprises four transparent windows, and further wherein each of said transparent windows has a corresponding hot wire disposed thereon.

* * * * *